United States Patent
Huang

(10) Patent No.: US 11,327,255 B1
(45) Date of Patent: May 10, 2022

(54) HIGH-EFFICIENCY OPTICAL COMMUNICATION MODULE OF REDUCED SIZE

(71) Applicant: SHUNYUN TECHNOLOGY (ZHONG SHAN) LIMITED, Zhongshan (CN)

(72) Inventor: Jie Huang, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 17/313,316

(22) Filed: May 6, 2021

(30) Foreign Application Priority Data

Feb. 9, 2021 (CN) .......................... 202110177631.0

(51) Int. Cl.
| | |
|---|---|
| *H04J 14/02* | (2006.01) |
| *G02B 6/42* | (2006.01) |
| *H04B 10/60* | (2013.01) |
| *H04B 10/25* | (2013.01) |
| *H04B 10/50* | (2013.01) |

(52) U.S. Cl.
CPC ......... *G02B 6/4246* (2013.01); *G02B 6/4286* (2013.01); *H04B 10/25* (2013.01); *H04B 10/50* (2013.01); *H04B 10/60* (2013.01); *H04J 14/02* (2013.01)

(58) Field of Classification Search
CPC ............ G02B 6/12019; G02B 6/12009; G02B 6/4246; G02B 6/4286; H04B 10/50; H04B 10/60; H04J 14/02
See application file for complete search history.

(56) References Cited

U.S. PATENT DOCUMENTS

| | | | |
|---|---|---|---|
| 6,415,071 B1 * | 7/2002 | Saito ................. | G02B 6/12019 385/24 |
| 9,341,786 B1 * | 5/2016 | Gamache ................ | G02B 6/30 |
| 9,494,735 B2 | 11/2016 | Bulthuis | |

(Continued)

FOREIGN PATENT DOCUMENTS

| | | |
|---|---|---|
| CN | 101344625 A | 1/2009 |
| CN | 104350400 A | 2/2015 |

(Continued)

*Primary Examiner* — David C Payne
*Assistant Examiner* — Pranesh K Barua
(74) *Attorney, Agent, or Firm* — ScienBiziP, P.C.

(57) ABSTRACT

An optical-communication module includes an arrayed waveguide grating; a light transmitter including light-emitting elements for emitting first signal beams into the arrayed waveguide grating, wherein the first signal beams are converged into one first communication beam in the arrayed waveguide grating; a wavelength division multiplexing filter is used to transmit the first communication beam emitted by the arrayed waveguide grating to an optical fiber; an optical receiver including optical sensor for sensing second signal beams emitted from the arrayed waveguide grating. The optical fiber is used for transmitting a second communication beam to the wavelength division multiplexing filter. The second communication light beam enters the arrayed waveguide grating through the wavelength division multiplexing filter. The second communication beam is divided into the second signal beams in the arrayed waveguide grating.

9 Claims, 4 Drawing Sheets

(56) References Cited

U.S. PATENT DOCUMENTS

| | | | | |
|---|---|---|---|---|
| 2003/0095737 A1* | 5/2003 | Welch | ............ | B82Y 20/00 |
| | | | | 385/14 |
| 2005/0179980 A1* | 8/2005 | Iwatsuka | ............ | G02F 1/09 |
| | | | | 359/280 |
| 2006/0067616 A1* | 3/2006 | Kanji | ............ | G02B 6/3846 |
| | | | | 385/37 |
| 2011/0292680 A1* | 12/2011 | Tsai | ............ | G02B 6/0055 |
| | | | | 385/27 |
| 2020/0168655 A1* | 5/2020 | Wang | ............ | G02B 6/428 |

FOREIGN PATENT DOCUMENTS

| | | |
|---|---|---|
| CN | 110376688 A | 10/2019 |
| CN | 110426793 A | 11/2019 |
| TW | I511477 B | 12/2015 |
| WO | 2009122577 A1 | 10/2009 |

\* cited by examiner

HIGH-EFFICIENCY OPTICAL COMMUNICATION MODULE OF REDUCED SIZE

FIELD

The subject matter herein generally relates to optical communications.

BACKGROUND

Optical communications have low transmission loss, high data confidentiality, total immunity to electromagnetic interference (EMI), and wide bandwidth. The optical communication module receives inward optical signals and converts the optical signals into electrical signals. The optical communication module can also convert electrical signals into optical signals, and then transmit the optical signals outward.

Conventional optical-communication modules use the wavelength-division multiplexing filter (WDM filter) to achieve the function of two-way communication, so that a single optical-communication module can receive and can output optical signals, thereby increasing the efficiency of communication. The current level of communication efficiency of such optical-communication module is less than optimal.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
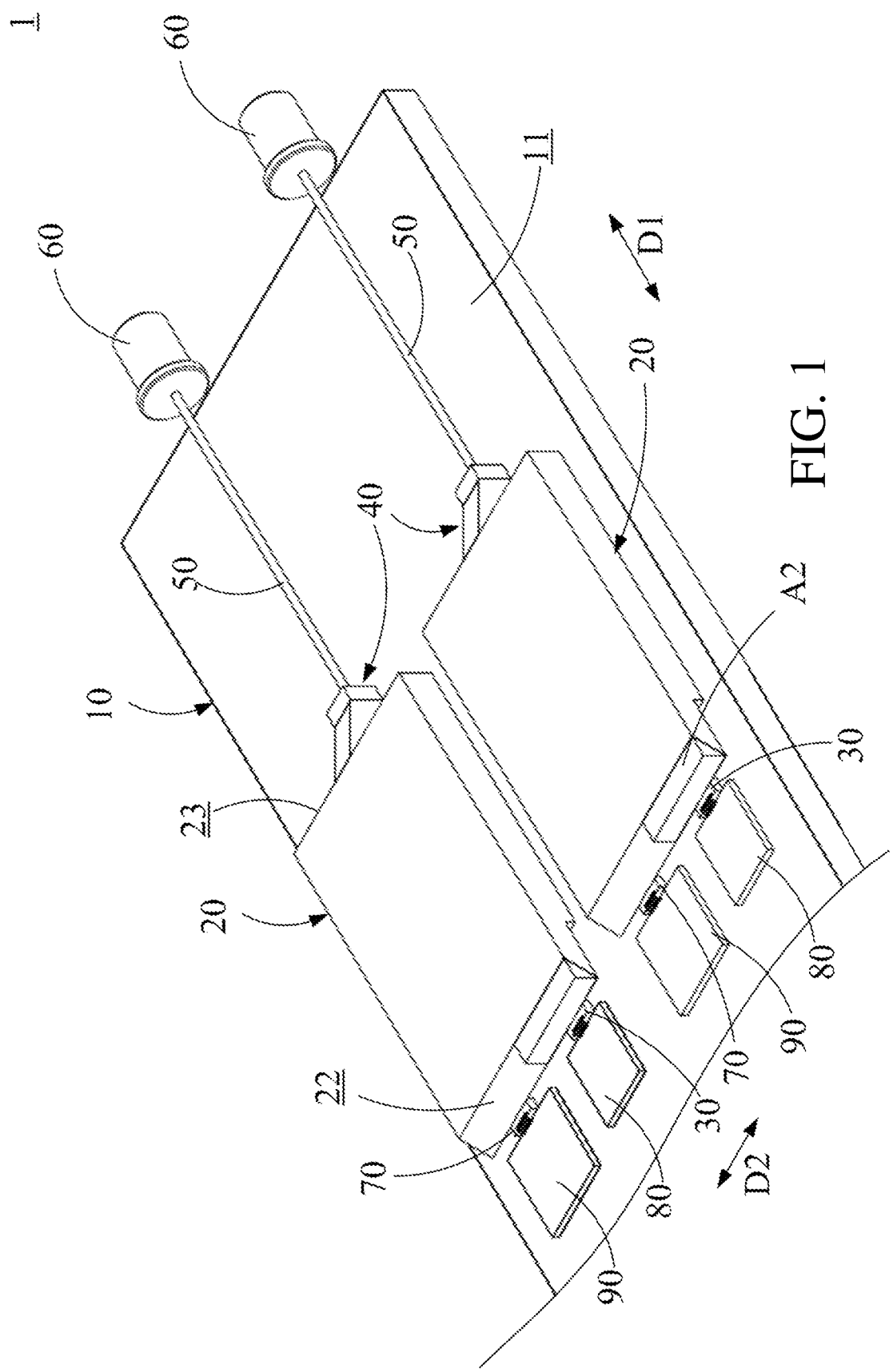
FIG. 1 is a perspective view of an optical-communication module in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is defined as directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
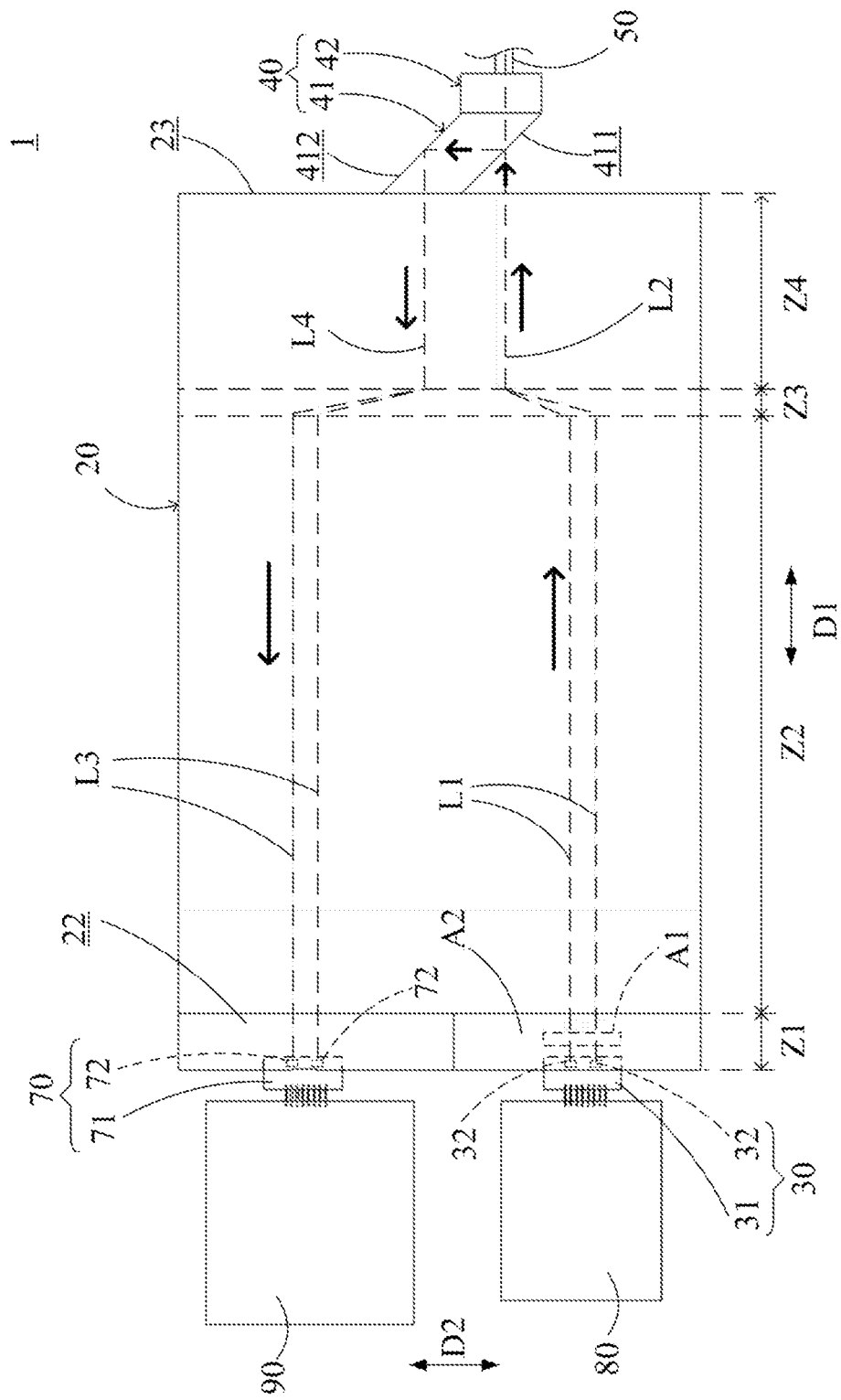
FIG. 2 is a schematic top view diagram of the optical-communication module of FIG. 1.

FIG. 1 is a perspective view of an optical-communication module 1 in accordance with an embodiment of the present disclosure. FIG. 2 is a top view of the optical-communication module 1. For the purpose of clarity, some components are omitted in FIG. 2. The optical-communication module 1 can be installed in an electronic device so that the electronic device can transmit and receive optical signals. The electronic device can be a computer, a server, or a router, but is not limited thereto. The optical-communication module 1 is an optical transceiver module capable of duplex (two-way) communication. The optical-communication module 1 can receive electronic output signals from the electronic device, convert the electronic output signals to optical output signals, and output the optical output signals as transmissions via an external optical fiber. Moreover, the optical-communication module 1 can receive optical input signals from the external optical fiber, and convert the optical input signals to electronic input signals. The optical-communication module 1 can transmit the optical input signals to the electronic device.

The optical-communication module 1 includes a circuit board 10, two arrayed waveguide gratings (AWGs) 20, two light transmitters 30, two wavelength-division multiplexing filters (WDM filters) 40, two optical fibers 50, two optical connectors 60, and two optical receivers 70. The circuit board 10 may be an elongated structure, extending in a communication direction D1. The arrayed waveguide gratings 20 may be an elongated plate, extending in a communication direction D1. The arrayed waveguide gratings 20 are disposed on the circuit board 10, and arranged in an arrangement direction D2. The arrangement direction D2 can be perpendicular to the communication direction D1. In the embodiment, the arrayed waveguide gratings 20 are affixed to the upper surface of the circuit board 10. In other words, the arrayed waveguide gratings 20 are in direct contact with, and attached to, the circuit board 10, and the arrayed waveguide gratings 20 extend parallel to the circuit board 10.

In the embodiment, the optical-communication module 1 includes two arrayed waveguide gratings 20. However, there may be one or at least three arrayed waveguide gratings 20. Moreover, each arrayed waveguide grating 20 is between one light transmitter 30 and one wavelength-division multiplexing filter 40, and each arrayed waveguide gratings 20 is between one optical receiver 70 and one wavelength-division multiplexing filter 40.

The light transmitters 30 are disposed on the upper surface 11 of the circuit board 10, and emit first signal beams L1 to the arrayed waveguide gratings 20. In the embodiment, the optical-communication module 1 includes two light transmitters 30, and each arrayed waveguide grating 20 corresponds to one light transmitter 30. However, each arrayed waveguide grating 20 can correspond to two or more light transmitters 30.

Each light transmitter 30 includes a first base 31 and light-emitting elements 32. The first base 31 is affixed to the upper surface 11 of the circuit board 10. The light-emitting elements 32 are disposed on the first base 31, and face the arrayed waveguide grating 20. Each light-emitting element 32 emits one first signal beam L1 to the arrayed waveguide grating 20 at the same time. In the embodiment, the light-emitting elements 32 are arranged in the arrangement direction D2. The first signal beams L1 of the light-emitting elements 32 are parallel to each other, and the wavelengths of the first signal beams L1 are different from those of other beams. The parallel first signal beams L1 are converged into one first communication beam L2 in the arrayed waveguide grating 20. The first communication beam L2 includes various wavelengths, and travels in the arrayed waveguide grating 20 in the communication direction D1.

In the embodiment, for the purpose of clarity, each light transmitter 30 only draws two light-emitting elements 32. However, the number of the light-emitting elements 32 is not limited, each light transmitter 30 may include at least three light-emitting elements 32. The light transmitter 30 may be Vertical-Cavity Surface-Emitting Laser (VCSEL), but it is not limited thereto. In some embodiments, the light-emitting element 32 may be laser diode (LD).

Each WDM filter 40 transmits the first communication beam L2 emitted from the arrayed waveguide grating 20 to an optical fiber 50. One end of the optical fiber 50 is connected to the WDM filter 40, and the other end of the optical fiber 50 is connected to the optical connector 60. The optical connector 60 is for an external optical fiber. The first communication beam L2 in the optical fiber 50 can be transmitted to an external apparatus via the optical connector 60 and the external optical fiber. In the embodiment, the optical connector 60 may be a receptacle.

In the embodiment, the optical-communication module 1 includes two WDM filters 40, and each arrayed waveguide grating 20 corresponds to one WDM filter 40. However, the number of the WDM filters 40 is not limited, each arrayed waveguide grating 20 can correspond to at least two WDM filters 40. The number of the optical fibers 50 and the number of the optical connectors 60 correspond to the number of the WDM filters 40.

Therefore, each light transmitter 30 can utilize the light-emitting elements 32 to simultaneously emit multiple first signal beams L1 with different wavelengths, depending on the arrayed waveguide grating 20, thereby improving the transmission effectiveness of the optical-communication module 1.

In the embodiment, the external apparatus transmits second communication beams L4 to the external optical fibers. Each second communication beam L4 includes various wavelengths. Each second communication beam L4 enters into one of the optical fiber 50 via one of the optical connectors 60. Each optical fiber 50 transmits the second communication beam L4 to one WDM filter 40. The second communication beam L4 enters into one arrayed waveguide grating 20 via the WDM filter 40, and the second communication beam L4 travels in the arrayed waveguide grating 20 in the communication direction D1. The second communication beam L4 is divided into multiple parallel second signal beams L3 when it enters into the arrayed waveguide grating 20, and the second signal beam L3 includes different wavelengths from others.

Each optical receiver 70 is disposed on the upper surface 11 of the circuit board 10, and senses the second signal beams L3 emitted from the arrayed waveguide grating 20. In the embodiment, each optical receiver 70 is adjacent to one light transmitter 30, and all of the optical receivers 70 and the light transmitters 30 are alternately arranged in the arrangement direction D2. The optical-communication module 1 includes two optical receivers 70, and each arrayed waveguide grating 20 corresponds to one optical receiver 70. However, the number of the optical receivers 70 is not limited thereto. For example, each arrayed waveguide grating 20 may correspond to at least two optical receivers 70.

Each optical receiver 70 includes a second base 71 and optical sensors 72. The second base 71 is affixed to the upper surface 11 of the circuit board 10. The optical sensors 72 are disposed on the second base 71, and face the arrayed waveguide grating 20. The optical sensors 72 sense the second signal beams L3 emitted from the arrayed waveguide grating 20. In the embodiment, the optical sensors 72 are arranged in the arrangement direction D2, and the second signal beams L3 received by the optical sensor 72 are parallel to each other.

Thereby, depending on the arrayed waveguide grating 20, each optical receiver 70 can use multiple optical sensors 72 to receive multiple signal beams with different wavelengths at the same time, thereby improving the transmission efficiency of the optical-communication module 1.

In the embodiment, at least two arrayed waveguide gratings 20 and at least two optical connectors 60 can be mounted in the same optical-communication module 1 by at least one light transmitter 30 and at least one optical receiver 70 corresponding to the same arrayed waveguide grating 20, thereby improving the communication performance of single optical-communication module 1. In addition, the optical-communication module 1 of the present disclosure enables the optical-communication module 1 to have a two-way communication function through the arrayed waveguide grating 20 and the WDM filter 40.

In the embodiment, the optical-communication module 1 further includes two optical drives 80 and two transimpedance amplifiers (TIAs) 90. Each optical drive 80 is disposed on the upper surface 11 of the circuit board 10, and electrically connected to one light transmitter 30. In the embodiment, the optical drive 80 is electrically connected to the electronic device by wire. In another embodiment, the optical drive 80 is electrically connected to the electronic device via the circuit board 10. Each optical drive 80 can receive electronic output signals from the electronic device, and the optical drive 80 controls the light transmitter 30 to emit first signal beams L1 with optical output signals according to the electronic output signals.

The transimpedance amplifier 90 is disposed on the upper surface 11 of the circuit board 10, and is electrically connected to the optical receiver 70. In the embodiment, the transimpedance amplifier 90 is electrically connected to the electronic device by wire. In another embodiment, the transimpedance amplifier 90 is electrically connected to the electronic device via the circuit board 10. The optical receiver 70 converts the optical input signals of the second signal beams L3 to the electronic input signals, and the transimpedance amplifier 90 enhances and transmits the electronic input signals to the electronic device.

In the embodiment, each arrayed waveguide grating 20 includes a first end surface 22 and a second end surface 23 opposite to the first end surface 22. The first end surface 22 and the second end surface extend perpendicular to the communication direction D1, and extend in the arrangement direction D2. Each WDM filter 40 is connected to the second end surface 23. Each WDM filter 40 further includes a light guide element 41 and a connection element 42. The light guide element 41 is connected to the second end surface 23, and is inclined relative to the second end surface 23. The connection element 42 is connected to the light guide element 41 and the optical fiber 50.

The light guide element 41 includes a first inclined surface 411 and a second inclined surface 412. The first inclined surface 411 and the second inclined surface 412 are inclined relative to the second end surface 23, and the first inclined surface 411 is parallel to the second inclined surface 412. The second communication beam L4 enters into the light guide element 41 from the connection element 42, and then enters into the arrayed waveguide grating 20 via the second end surface 23 after being reflected by the second inclined surface 412 and the first inclined surface 411. The first communication beam L2 enters into the light guide element 41 from the arrayed waveguide grating 20 after passing through the first inclined surface 411, and then enters into the optical fiber 50 via the connection element 42.

In the embodiment, each arrayed waveguide grating 20 includes a reflection section Z1, a first segment Z2, a second segment Z3, and a third segment Z4 in the communication direction D1 in sequence. The first end surface 22 is in the reflection section Z1. The materials of the portions of the arrayed waveguide grating 20 in the first segment Z2 and in the second segment Z3 are different from the materials of the second segment Z3. Moreover, the first signal beams L1 and the second signal beams L3 are reflected in the first segment Z2. The first signal beams L1 and the second signal beam L3 in the first segment Z2 are parallel to each other. The first signal beams L1 and the second signal beams L3 in the second segment Z3 are inclined relative to the communication direction D1.

In addition, the second end surface 23 is in the third segment Z4. The first communication beam L2 and the second communication beam L4 in the third segment Z4 are parallel to each other. However, the paths of the first signal beams L1, the second signal beams L3, the first communication beam L2 and the second communication beam L4 are not limited to those shown in FIG. 2. For example, parts of the paths of the first signal beams L1, and the second signal beams L3, the first communication beam L2 and/or the second communication beam L4 may be effectively curved.

Figure 3:
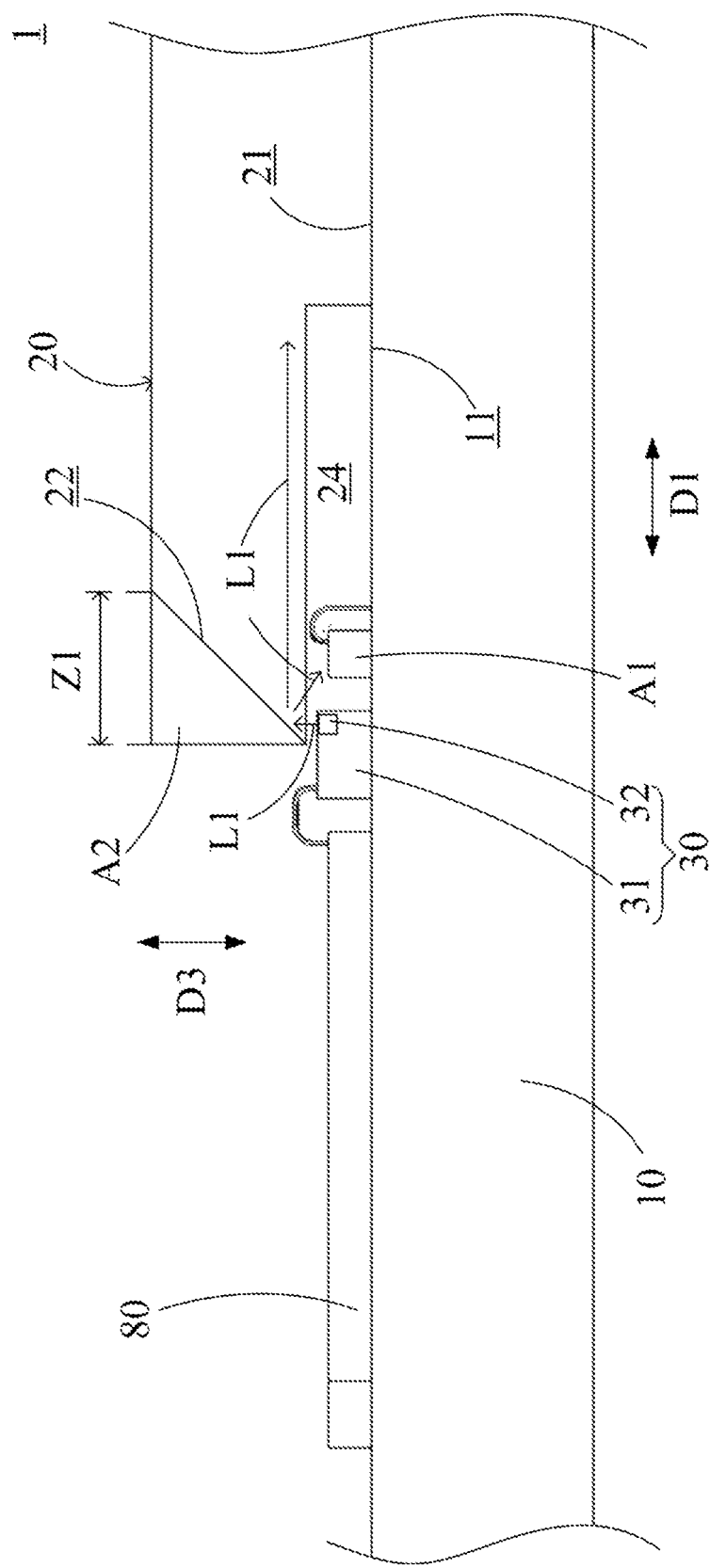
FIG. 3 is a cross-sectional view through one light transmitter of the optical-communication module of FIG. 1.

FIG. 3 is a cross-sectional view of the optical-communication module 1 of FIG. 1. In FIG. 3, the cross section passes through one light transmitter 30. The first end surface 22 of the arrayed waveguide grating 20 is inclined relative to the emitting direction D3. Moreover, the second end surface 23 in FIG. 2 is parallel to the emitting direction D3. The optical-communication module 1 further includes two monitor photodiodes (MPDs) A1 and two birefringent crystals A2. The number of the monitor photodiodes A1 corresponds to the number of the birefringent crystals A2.

The monitor photodiodes A1 are adjacent to the light transmitter 30. The monitor photodiodes A1 detect the first signal beams L1 emitted by the light-emitting elements 32 of the light transmitter 30. The birefringent crystal A2 is disposed on the first end surface 22. The birefringent crystal A2 is located above the light-emitting element 32 of the light transmitter 30 in the emitting direction D3. The emitting direction D3 is not the same as the communication direction D1. In the embodiment, the emitting direction D3 is perpendicular to the communication direction D1 and the arrangement direction D2 in FIG. 2.

The arrayed waveguide grating 20 further includes a receiving groove 24. The receiving groove 24 is formed on the lower surface 21, and connected to the circuit board 10. A portion of the light transmitter 30 is in the receiving groove 24. The monitor photodiode A1 is in the receiving groove 24. In the embodiment, the light-emitting elements 32 are in the receiving groove 24. In other words, the light-emitting elements 32 and the monitor photodiode A1 are between the arrayed waveguide grating 20 and the circuit board 10. Moreover, the light-emitting elements 32 and the monitor photodiode A1 are between the birefringent crystal A2 and the circuit board 10.

The first signal beams L1 emitted by the light transmitter 30 are reflected by the birefringent crystal A2 and travel in the communication direction D1, wherein a portion of each first signal beam L1 is reflected by the birefringent crystal A2 before falling on the monitor photodiode A1.

Figure 4:
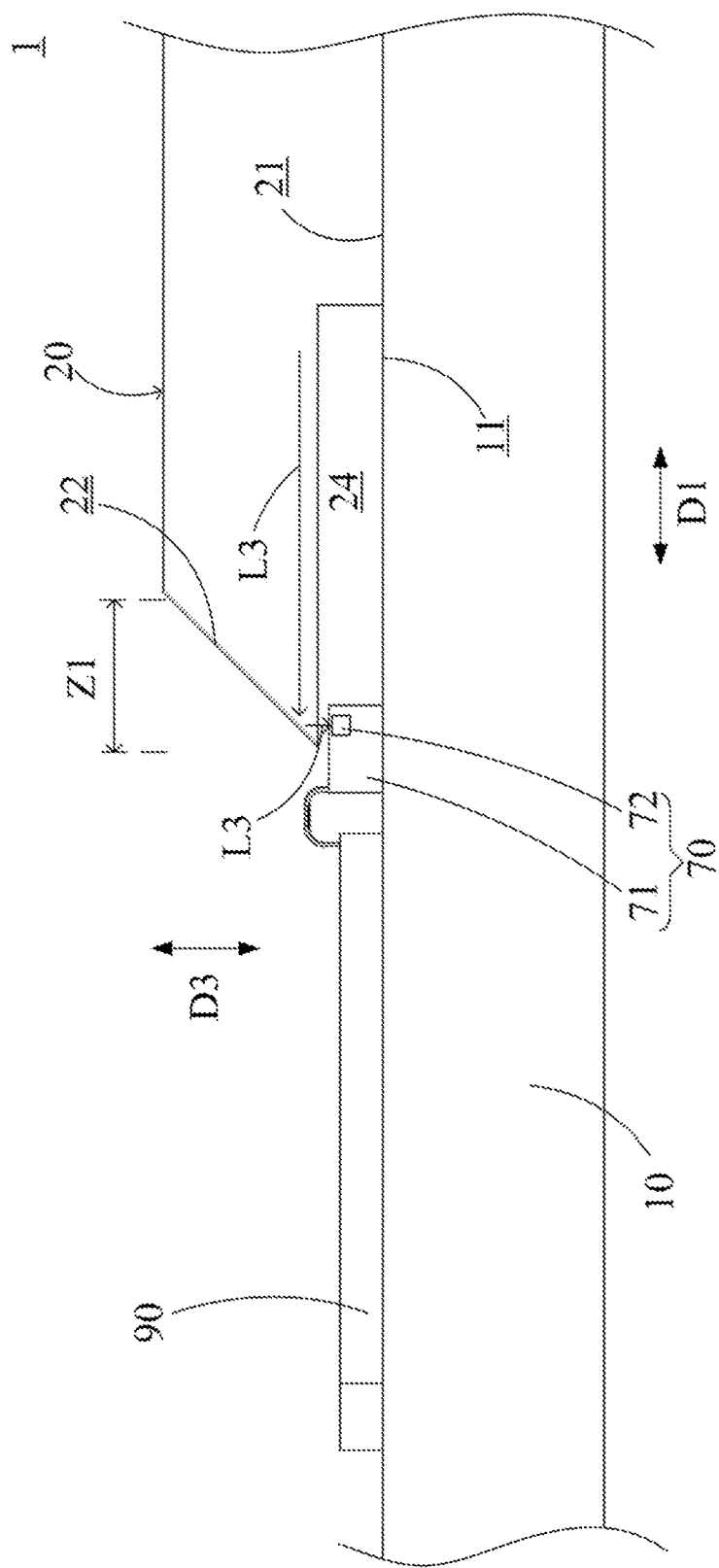
FIG. 4 is a cross-sectional view through one optical receiver of the optical-communication module of FIG. 1.

FIG. 4 is a cross-sectional view of the optical-communication module 1 of FIG. 1. In FIG. 4, the cross section passes through one optical receiver 70. The first end surface 22 is located above the optical receiver 70 in the emitting direction D3. The optical sensor 72 of the optical receiver 70 is in the receiving groove 24. The second signal beam L3 is reflected by the first end surface 22 towards the optical receiver 70 in the emitting direction D3.

While the receiving groove 24 of the present disclosure must accommodate the light transmitter 30, the optical receiver 70 and the monitor photodiode A1, the volume of the optical-communication module 1 can be significantly reduced. Moreover, the monitor photodiode A1 can directly receive the first signal beams L1 in the receiving groove 24 by mounting the birefringent crystal A2 on the first end surface 22 of the arrayed waveguide grating 20, thereby optimizing the optical paths and saving space.

The optical-communication module of the present disclosure enables two-way communication function in the optical-communication module because of the arrayed waveguide grating and the wavelength-division multiplexing filter. Moreover, depending on the arrayed waveguide grating, the light transmitter can use multiple light-emitting elements to transmit multiple signal beams with different wavelengths at the same time, and the optical receiver can use multiple optical sensors to receive multiple signal beams with different wavelengths at the same time, thereby improving the transmission speed and efficiency of the optical-communication module.

What is claimed is:

1. An optical-communication module comprising:
    an arrayed waveguide grating comprising a first end surface and a second end surface opposite to the first end surface;
    a light transmitter comprising a plurality of light-emitting elements configured to emit a plurality of first signal beams into the arrayed waveguide grating, wherein the first signal beams are converged to a first communication beam in the arrayed waveguide grating;
    a wavelength-division multiplexing filter configured to the transmit the first communication beam emitted from the arrayed waveguide grating to an optical fiber, and comprising:
        a light guide element connected to the second end surface, and comprising a first inclined surface and a second inclined surface inclined relative to the second end surface; and
        a connection element connected to the light guide element and the optical fiber; and an optical receiver comprising a plurality of optical sensors configured to sense a plurality of second signal beams emitted from the arrayed waveguide grating;

wherein the first communication beam enters into the light guide element from the arrayed waveguide grating after passing through the first inclined surface, and then enters into the optical fiber via the connection element;

wherein the optical fiber is configured to transmit a second communication beam to the connection element, and enters into the arrayed waveguide grating after being reflected by the second inclined surface and the first inclined surface, the second communication beam is divided into the second signal beams in the arrayed waveguide grating, wherein each of the first signal beams includes a wavelength different from others, and each of the second signal beams includes a wavelength different from others.

2. The optical-communication module as claimed in claim 1, wherein the first communication beam and the second communication beam travel inside the arrayed waveguide grating in a communication direction, the first communication beam is separated from the second communication beam inside the arrayed waveguide grating, and the arrayed waveguide grating extends in the communication direction.

3. The optical-communication module as claimed in claim 2, wherein the first end surface is inclined relative to the communication direction, the second end surface is perpendicular to the communication direction.

4. The optical-communication module as claimed in claim 3, further comprising a birefringent crystal disposed on the first end surface, the birefringent crystal is located above the light transmitter in an emitting direction, and the emitting direction is not equal to the communication direction, when the first signal beams travel in the communication direction after being reflected by the birefringent crystal.

5. The optical-communication module as claimed in claim 4, further comprising a monitor photodiode adjacent to the light transmitter, each of a portion of the first signal beams falls on the monitor photodiode after being reflected by the birefringent crystal.

6. The optical-communication module as claimed in claim 3, wherein the first end surface is located above the optical receiver in an emitting direction, the emitting direction is not equal to the communication direction, the second signal beams falls on the optical receiver in the emitting direction after being reflected by the first end surface.

7. The optical-communication module as claimed in claim 3, wherein the first inclined surface is parallel to the second inclined surface.

8. The optical-communication module as claimed in claim 1, further comprising a circuit board, the arrayed waveguide grating is affixed to the circuit board, and the arrayed waveguide grating further comprises a receiving groove connected to the circuit board, and the light transmitter is located in the receiving groove.

9. The optical-communication module as claimed in claim 8, comprising an optical drive and a transimpedance amplifier, the optical drive is disposed on the circuit board, and is electrically connected to the light transmitter, and the transimpedance amplifier is disposed on the circuit board, and is electrically connected to the optical receiver, wherein the optical drive controls the light transmitter to emit the first signal beams with a plurality of optical output signals according to electronic output signals, and the optical receiver is configured to convert a plurality of optical input signals of the second signal beams to electronic input signals, and the transimpedance amplifier is configured to enhance the electronic input signals.

* * * * *